United States Patent [19]

Hurd

[11] Patent Number: 4,457,422
[45] Date of Patent: Jul. 3, 1984

[54] ELEVATOR CONVEYOR

[75] Inventor: Stanley E. Hurd, Sunnyvale, Calif.

[73] Assignee: Machine Development Company, Inc., Dublin, Calif.

[21] Appl. No.: 189,963

[22] Filed: Sep. 23, 1980

Related U.S. Application Data

[60] Continuation of Ser. No. 31,289, Apr. 19, 1979, abandoned, which is a division of Ser. No. 845,317, Oct. 25, 1977, abandoned.

[51] Int. Cl.³ .............................................. B65G 15/14
[52] U.S. Cl. ................................. 198/604; 198/607; 198/628; 198/611; 198/620
[58] Field of Search ............... 198/604, 607, 626–628, 198/611, 620, 624

[56] References Cited

U.S. PATENT DOCUMENTS

| 2,805,762 | 9/1957 | Kampfer | 198/628 |
| 2,971,632 | 2/1961 | Sauvee | 198/628 |
| 2,987,166 | 6/1961 | Gray | 198/628 |
| 3,587,826 | 6/1971 | Holzer et al. | 198/604 |
| 3,923,169 | 12/1975 | Van Drie | 198/611 |

FOREIGN PATENT DOCUMENTS

| 583761 | 1/1925 | France | 198/626 |
| 1380653 | 11/1964 | France | 198/626 |
| 1403651 | 11/1965 | France | 198/628 |

Primary Examiner—Joseph E. Valenza
Attorney, Agent, or Firm—Walsh, Patrick J.

[57] ABSTRACT

A conveyor for moving articles, typically cartons from one elevation to another in a continuous path by means of tensioned squeeze belts. The conveyor may lift or lower articles and cooperates with infeed and outtake conveyors as part of a conveying system.

7 Claims, 9 Drawing Figures

ELEVATOR CONVEYOR

This is a continuation of application Ser. No. 31,289 filed Apr. 19, 1979 which was a division of Ser. No. 845,317 filed Oct. 25, 1977, both now abandoned.

PRIOR ART

A conventional arrangement for elevating articles such as cartons includes an infeed conveyor moving cartons onto a platform-type elevator which lifts (or lowers) the carton. This arrangement involves a "butt transfer" of the cartons from the infeed conveyor to the elevator, which occasionally results in carton jams reducing conveyor/elevator reliability.

Other elevator conveyors use pneumatic means for applying pressure to squeeze articles being conveyed. Such conveyors are cumbersome and require complex systems for developing and maintaining pneumatic pressure.

SUMMARY OF THE INVENTION

The present invention relates to the treansport of articles, especially cartons from one elevation to another; i.e., either from lower to higher or from higher to lower. In a preferred form of the invention, a plurality of tensioned belts engage opposite sides of the article being raised or lowered. The conveying path may be "S" shaped in which the articles retain their same orientation relative to the conveyor after traversing the "S" shaped path. If desired, the conveyed article may be "turned over" or inverted by conveyance through a "C" shaped path. Again, in either case the article may be raised or lowered.

Articles are delivered to a conveyor of the present invention by any conventional conveying means such as a belt conveyor.

Articles entering the conveyor are received by confronting, tensioned belts which engage opposite surfaces (typically top and bottom) of each article. The tensioned belts are arranged to define an entrance section in which the belts are spaced to engage each carton. The confronting belts are trained over a convex form for changing the direction of the cartons from horizontal to vertical. The tensioned belts carry each carton through a vertical zone in which the cartons are supported and moved only by the tensioned belts. Thereafter, the belts are again trained over a second convex form for changing conveying direction back to the horizontal. The confronting belts carry each carton over the convex form and deliver them to a conventional out-feed conveyor. The second convex form may be arranged to be on the opposite side of the conveying path from the first convex form, in which event, the conveyor defines an "S" shaped path and cartons continue to move in the same direction after leaving the elevator conveyor. If desired, a "C" shaped path may be defined by placing both convex forms on the same side of the elevator apparatus; i.e., both forms on the top side of cartons being conveyed. When using a "C" shaped path each carton will be inverted as it is elevated and its direction of conveyance will be reversed.

The confronting, tensioned conveying belts comprise a plurality of sets of endless belts arranged to cooperate in conveying articles. First and second sets of belts cooperate to define the entrance section of the conveyor and are each trained over the convex form to change conveying direction from horizontal to vertical and to bring the belts into coplanar relationship for engaging, supporting, and conveying each article. The cooperating belts apply a gentle squeeze action to the articles being conveyed. The first belt set moves in an endless path around the convex form while the second belt set carries on beyond the convex form through an intermediate vertical conveying zone. A third belt set being a linear continuation of the first set, extends from the first belt set to the terminal or exit section of the conveyor. The second and third belt sets cooperate to define an intermediate vertical conveying section in which the belts engage, support and convey articles vertically between the entrance and exit portions of the conveyor.

The third belt set and a fourth belt set cooperate to define an exit section from the conveyor. Both the third and fourth belt sets are trained over a convex form for changing conveying direction from the vertical back to the horizontal.

OBJECTS OF THE INVENTION

An object of the invention is to provide a reliable elevator conveyor for lifting or lowering articles.

Another object of the invention is to provide an elevator conveyor which utilizes confronting, tensioned, squeeze belts for moving articles.

Another object of the invention is to provide an elevator conveyor for moving articles through an "S"-shaped path.

Another object is to provide an elevator conveyor for moving articles through a "C"-shaped path.

Other and further objects will occur to one skilled in the art upon practice of the invention or upon an understanding of the specification and drawing.

Preferred and modified embodiments of the invention have been chosen for illustration and are shown in the accompanying drawing in which.

DETAILED DESCRIPTION OF THE INVENTION

Figure 1:
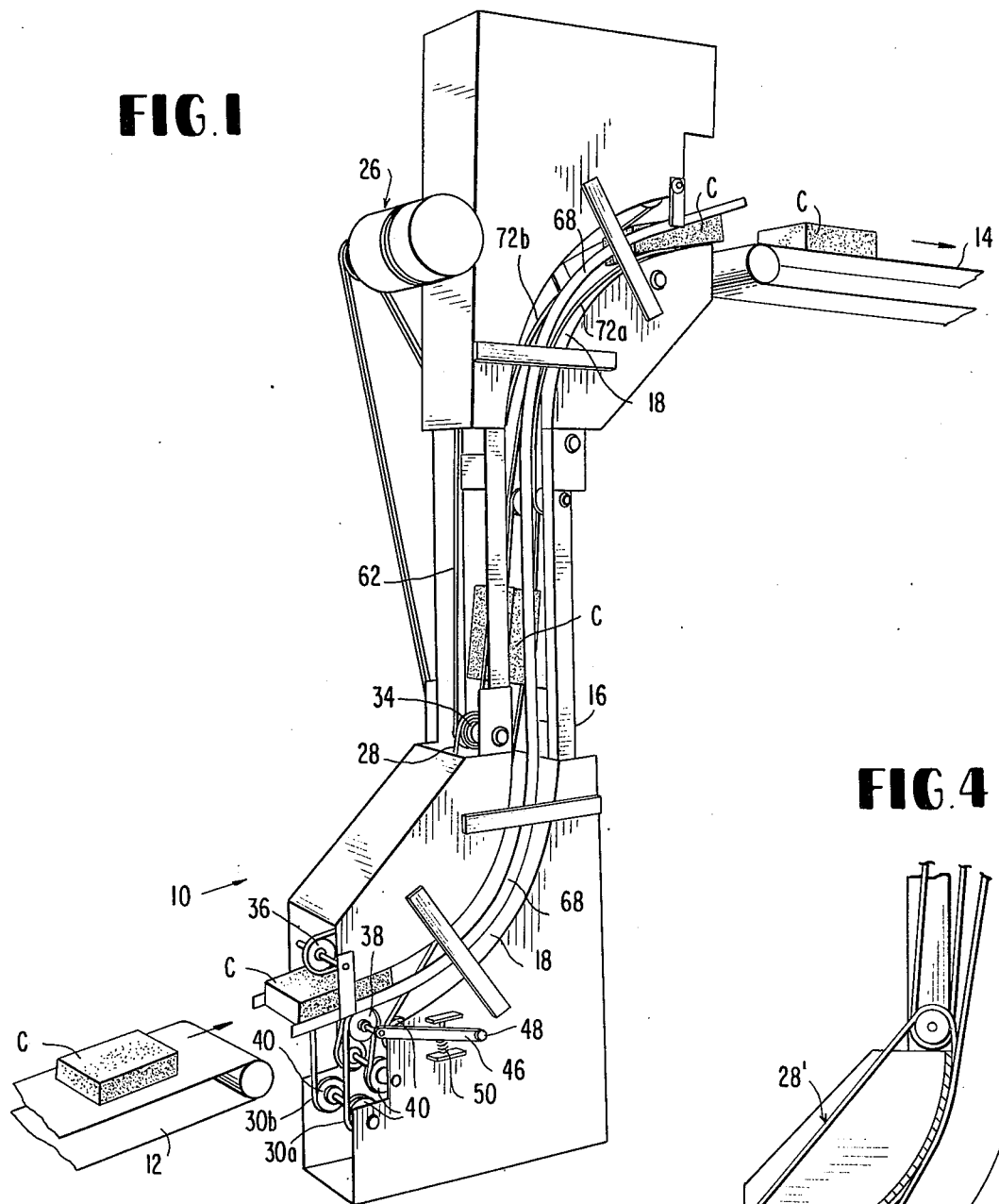
FIG. 1 is a perspective view of an elevator conveyor according to the invention.
Figure 3:
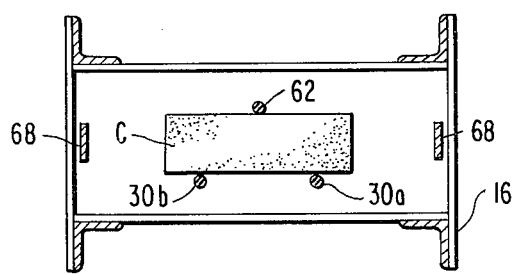
FIG. 3 is a sectional view taken along line 3—3 of FIG. 2.
Figure 2:
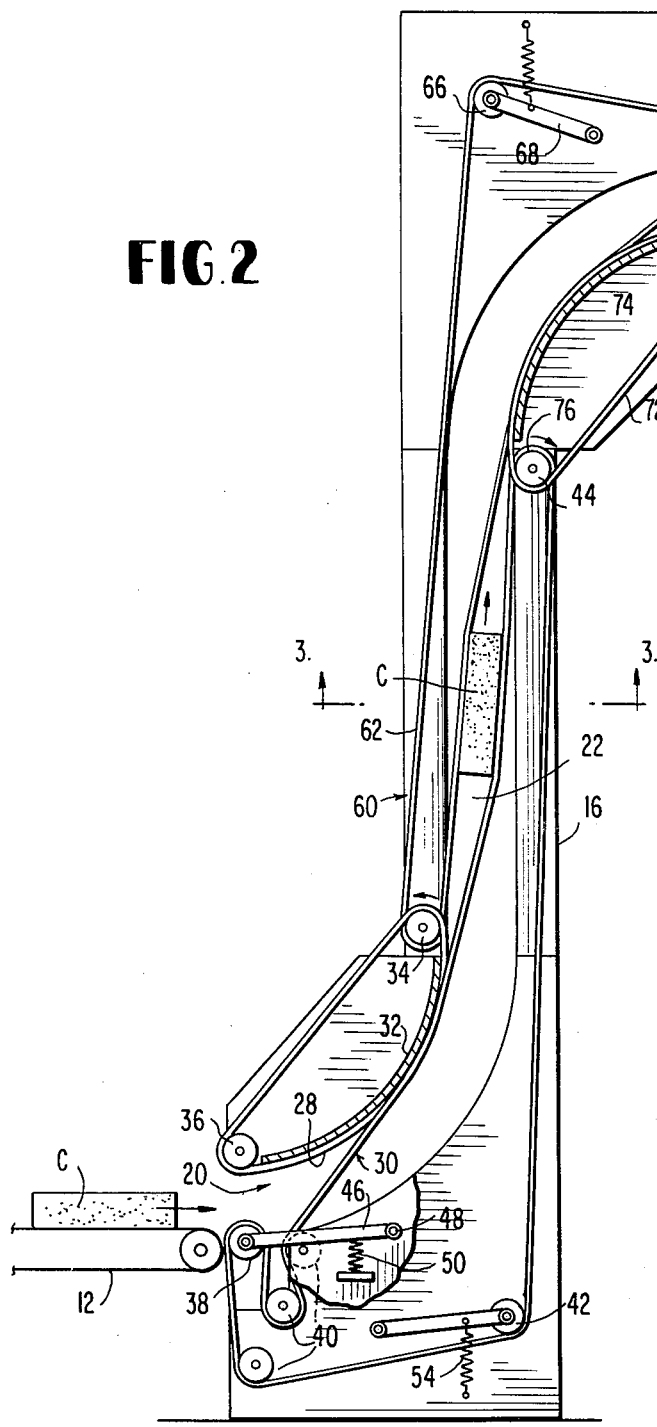
FIG. 2 is a vertical section view of the conveyor shown in FIG. 1.

Referring now to the drawing and in particular to FIGS. 1-3, a preferred embodiment of the elevator conveyor 10 includes an "S" shaped elevator in which articles such as cartons C or packages are moved from an infeed conveyor 12 of conventional construction through the elevator conveyor to a take-off conveyor 14 also of conventional design. Viewed generally in FIG. 1, the elevator conveyor includes an upstanding machine frame 16, an "S" shaped conveyor path 18, an entrance section 20 defining a curved path through which the articles C are moved from a horizontal to a generally vertical orientation, an intermediate straight vertical section 22, and a curved terminal section 24 in which the articles resume their horizontal orientation. A plurality of conveying belts cooperate to move the articles through the "S" shaped path. Drive means 26 including a motor and drive belts provide motive power for each of the conveying belts.

As best shown in FIG. 2, the entrance section 20 of the elevator conveyor is defined by spaced confronting belt sets 28 and 30. The first belt set 28 preferably comprises a single endless belt trained over a convex support plate 32 and spaced pulleys 34, 36 including driven pulley 34 and idler pulley 36 for movement in the direction indicated by the arrow.

A second belt set 30 comprising a pair of laterally spaced endless belts 30a and 30b extend from the entrance section through the intermediate straight vertical section 22 of the conveyor. The second belt set is trained over spaced pulleys/wheels including driven pressure feed wheels 38, idler pulleys 40, tension pulleys 42, and driven pulleys 44. It will be understood that each belt 30a and 30b in the second belt set is provided with the pulley/wheel arrangement shown in FIG. 2. Pressure feed wheels 38 are mounted on a common shaft at the end of arms 46 which are spring biased about pivot point 48. The pressure feed wheels are pushed upwardly by a spring 50 so that a carton is pressed against the first belt set 28. The first and second belt sets then cooperate to engage and positively drive each carton in the elevator. The second belt set 30 is spring loaded by means of pivoted spring-biased idler pulleys 42. This belt set is maintained in tension by means of tension springs 54.

It will be observed in FIG. 2 that the second belt set rides over the convex support plate 32 and cooperates with the first belt set to apply a "squeeze action" on each carton thereby to engage, support, and convey the cartons.

A third belt set 60 comprising preferably a single belt 62 extends from driven pulley 34 to the terminal section of the elevator conveyor over spaced idler pulleys 64, 66 with idler pulley 66 being spring loaded and pivotally mounted on arm 68 to apply tension to belt 62. The third belt set 60 confronts a portion of the second belt set to define the intermediate straight vertical section 22 of the elevator. As shown in FIGS. 2 and 3, the second and third belt sets, being in tension, apply a squeeze action to carton C. If desired, side guides 68 may be used to confine the conveyed articles to the desired path.

A fourth belt set 70 preferably comprising a pair of spaced belts 72a and 72b is trained over convex support plate 74 and spaced pulleys 76, 78 cooperate with the third belt set 60 to define the terminal section 24 of the elevator conveyor. Both pulleys 76, 78 are driven. The third belt set is also stretched over the convex support plate 74 to provide the desired squeeze action to cartons passing this section of the conveyor.

After moving through the elevator, cartons are removed by a suitable outfeed conveyor 14.

As shown best in FIG. 3, each of the belts used in the belt sets is preferably round and fabricated of urethane. Other belt configurations and materials may be used.

Each of the support plates 32, 74 preferably is in the form of a quadrant of a cylinder and is fabricated of a low friction material such as ultra high molecular weight (UHMW) polyethylene.

There are several alternative structures for feeding articles into the elevator.

Figure 4:
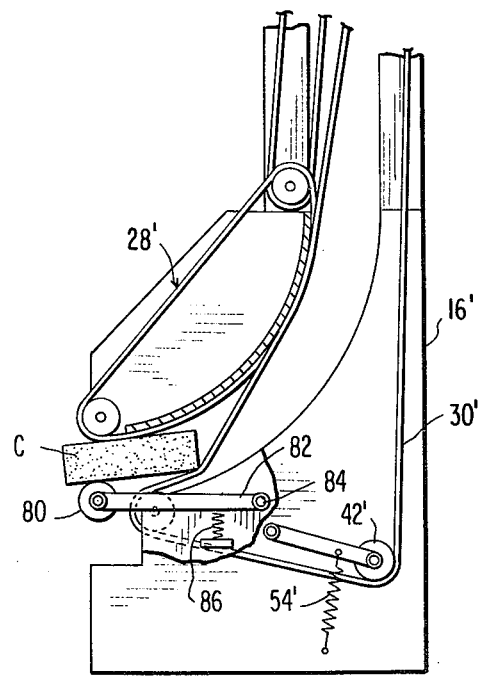
FIG. 4 is a modification of the entrance section of the elevator conveyor of FIGS. 1-3.

As shown in FIG. 4, a pair of non-driven pressure wheels 80 press conveyed articles C against the first belt set 30' which drives the articles into the elevator. Pressure wheels are mounted on arms 82 pivoted at 84, and pressed by compression springs 86 into contact with conveyed articles.

Figure 5:
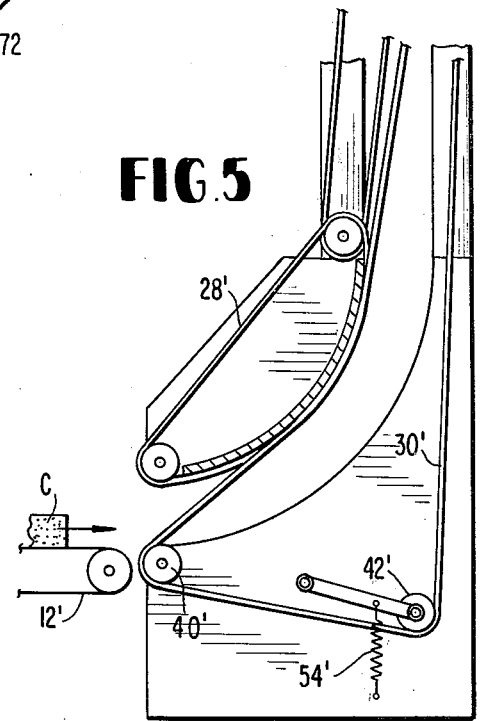
FIG. 5 is a further modification of the entrance section of the elevator conveyor of FIGS. 1-3.
Figure 6:
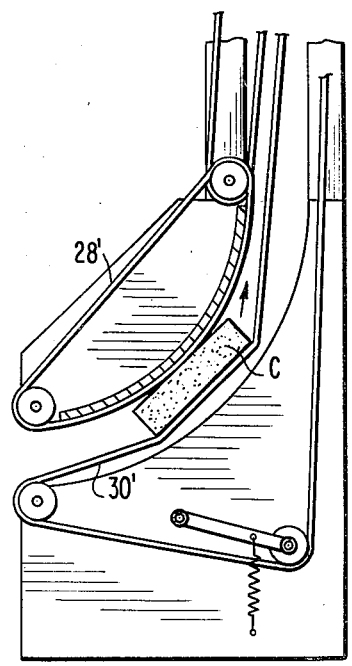
FIG. 6 illustrates a modified convex belt support member for the elevator conveyor.

The modified elevator shown in FIGS. 5 and 6 omits the pressure feed wheel arrangement and provides for direct entry of articles into the elevator. This arrangement is generally satisfactory for small light-weight cartons.

Figure 7:
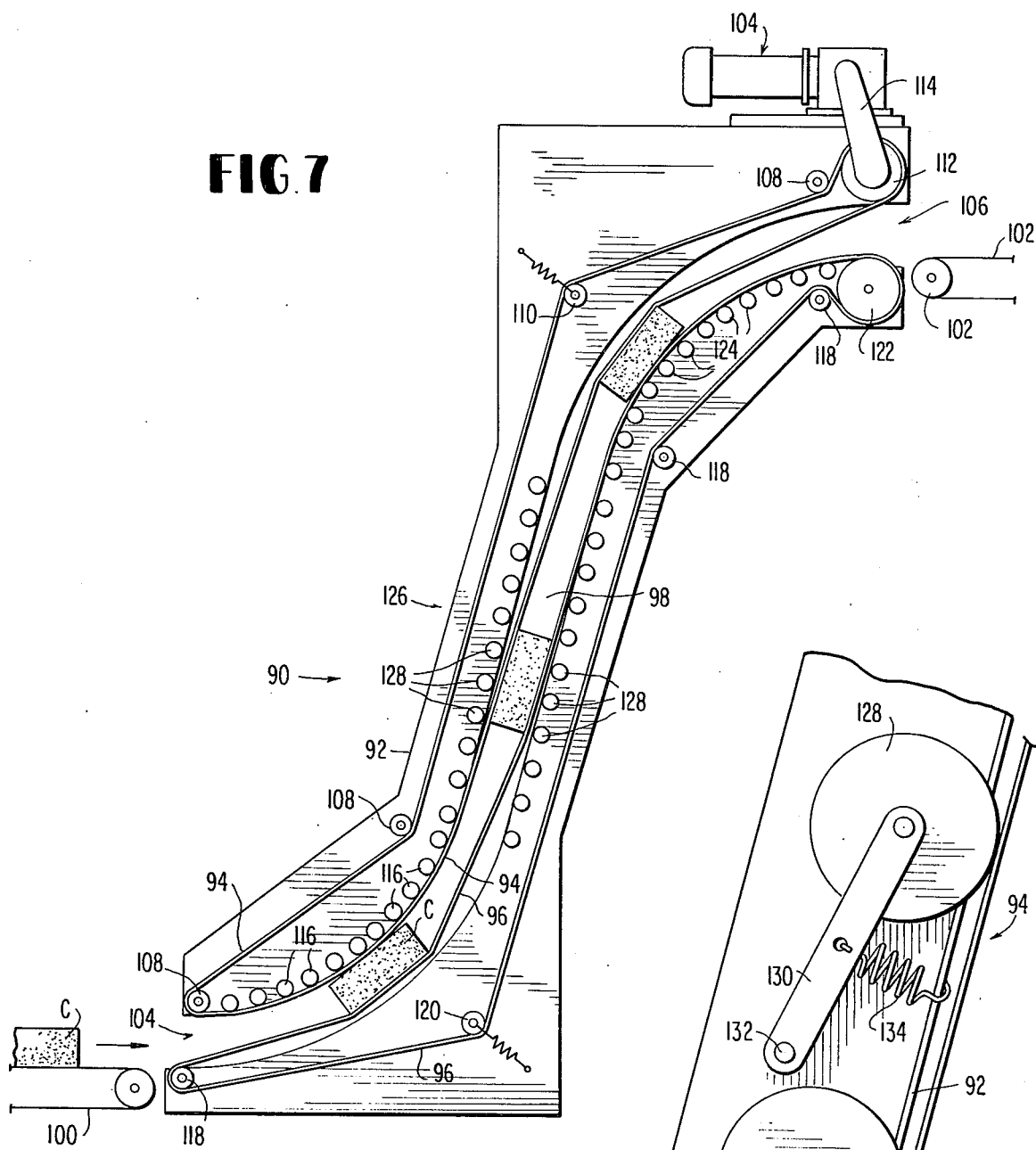
FIG. 7 illustrates in vertical section a modified embodiment of the invention.
Figure 8:
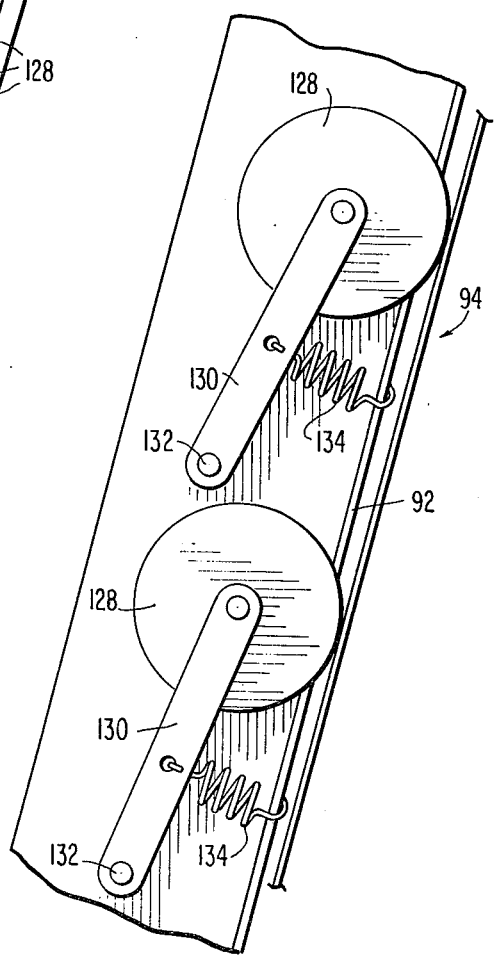
FIG. 8 illustrates the detail arrangement for squeeze rollers utilized in the embodiment of FIG. 7.

A further modified form of the invention is illustrated in FIGS. 7 and 8. Referring to these Figures, the modified elevator conveyor 90 comprises a machine frame 92, a pair of confronting tensioned belts 94, 96 defining an "S" shaped path 98 for conveying articles C between vertically spaced conventional conveyors 100, 102, and a drive unit 104. Both conveying belts 94, 96 are preferably endless web belts. Upper belt 94 extends from the entrance section 104 to the terminal section 106 over a plurality of pulleys including idler rollers 108, a tensioned roller 110, and a drive roller 112. The drive roller is driven by drive unit 104 through a suitable transmission 114. The upper conveyor belt 94 is trained over a succession of support rollers 116 defining a convex entrance section to the conveyor.

The lower belt 96 is trained over a plurality of rollers between the entrance section and the terminal section including idler rollers 118, a spring tensioned roller 120, and a drive roller 122 which may be driven by power unit 104 and a suitable power transmission (not shown). The exit or terminal section of the lower belt is trained over a plurality of support rollers 124 arranged in a convex row.

The intermediate straight section 126 of the conveyor includes a plurality of squeeze rollers 128 for supporting the upper and lower belts. Each squeeze roller is mounted at one end of a pair of spaced arms 130 pivoted about a common axis 132. A tension spring 134 fitted between the each arm and the machine frame presses each roller 128 into supporting contact with the conveying belt. FIG. 8 illustrates a squeeze roller supporting the upper belt. A similar arrangement is used for supporting the lower belt.

The squeeze rollers 128 enable the upper and lower belts to apply a gentle squeeze action to each conveying belt to facilitate conveying articles C through the straight vertical section.

A natural squeeze action occurs in each of the convex entrance section 104 and the exit section 106 as both upper and lower belts are trained over the convex lines of support rollers.

Figure 9:
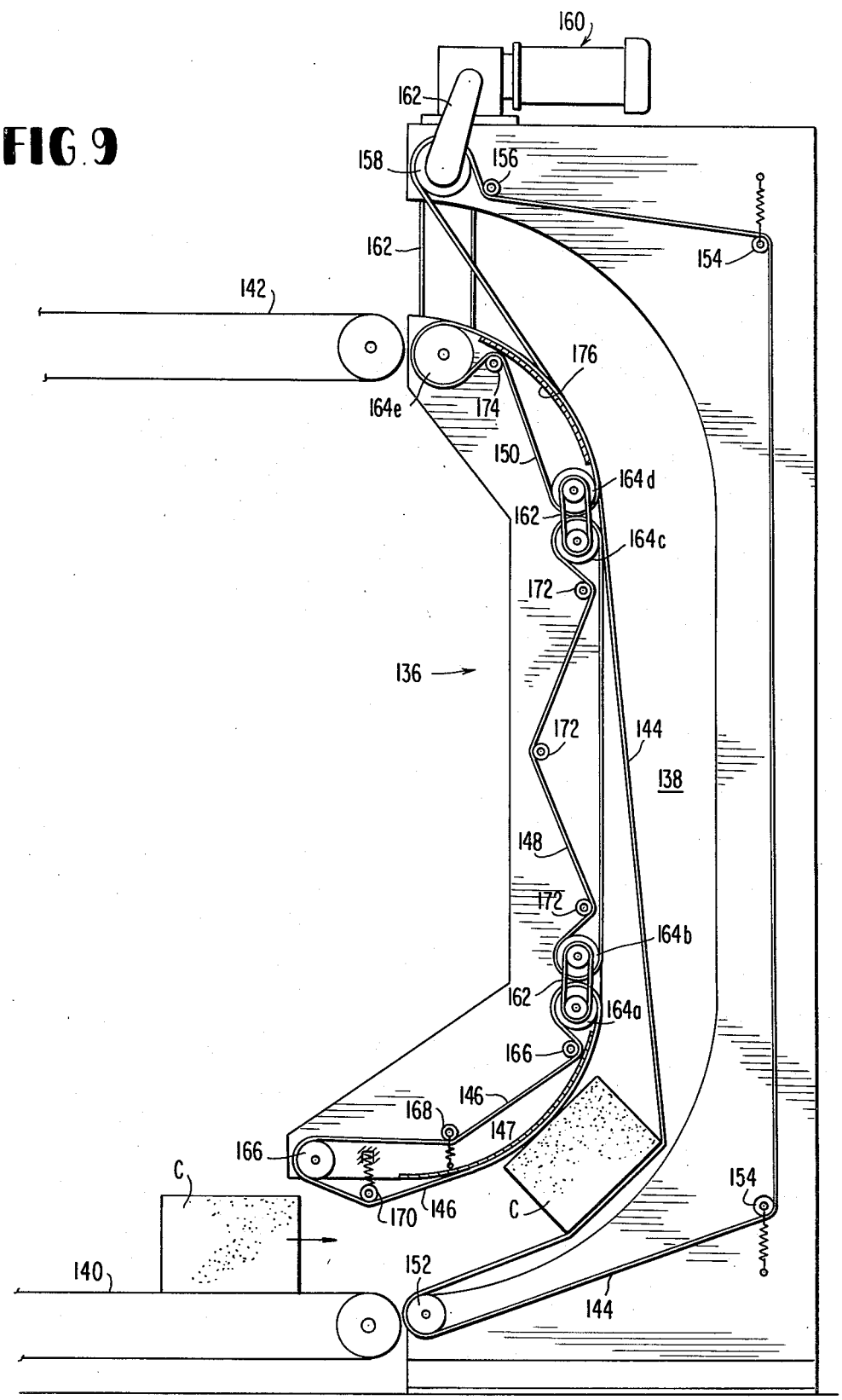
FIG. 9 is a further modified form of the invention in which an elevator conveyor moves articles through a "C" shaped path.

A further modification of the invention is illustrated in FIG. 9. The elevator conveyor 136 shown in FIG. 9 traverses a "C" shaped path 138 for moving articles C from a lower conveyor 140 to an upper conveyor 142. In the course of moving through the "C" shaped path, the articles C, typically cartons, are inverted and are delivered in the opposite direction from the arrival direction.

A lower belt 144 cooperates with a series of upper belts 146, 148, 150 for defining the "C" shaped path. The lower belt 144 is trained over an entrance idler pulley 152 or roller, a pair of spaced tensioned pulleys 154, an idler pulley 156, and a drive pulley 158.

The series of upper belts includes an entrance belt 146, an intermediate belt 148, and an exit section belt 150. The upper belts are driven from the main power unit 160 by a series of drive belts 162 interconnecting adjacent drive pulleys 164a–e. Each upper belt confronts and cooperates with a portion of the lower belt for engaging, supporting, and conveying the articles. The entrance upper belt 146 is trained over a convex support form 147, spaced idler pulleys 166, a spring tension pulley 168, and pressure pulley 170. A carton or article C entering the conveyor comes into pressure contact with the upper entrance belt 146 while the article is still on the infeed conveyor 140. This arrangement provides for positive drive of each carton into the elevator conveyor.

An intermediate upper belt 148 is trained over drive pulleys 164b–c and idler pulleys 172, and cooperates with the lower belt for vertical conveyance.

An exit section upper belt 150 is trained over drive pulleys 164d–e and an idler pulley 174. The exit belt moves over a convex support member 176 and together with the terminal portion of the lower belt defines the terminal portion of the elevator for delivering cartons to the take-off conveyor.

The upper and lower belts, being suitably held in tension, apply a gentle squeezing action to each article being conveyed and thus produce the vertical movement and inversion of each carton. It will be understood that in the embodiment of FIG. 9, the upper and lower belts may be round in cross section as in FIGS. 1–4, and may be arranged as shown in FIG. 3. Alternately, the upper and lower belts may be in the form of endless webs as in FIGS. 7 and 8, in which case each will be trained over rollers instead of pulleys.

What is claimed is:

1. An elevator conveyor for conveying cartons having substantially flat upper and lower surfaces spaced substantially parallel to each other from one elevation to another comprising a machine frame having a conveyor path therethrough extending from one elevation to another, said conveyor path including:
   (a) an entrance section having a curved path through which articles are moved from a generally horizontal to a generally vertical orientation;
   (b) an intermediate section through which articles are moved generally vertically, and,
   (c) an exit section having a curved path through which articles are moved from generally vertical to horizontal orientation, said entrance section being defined by first convex support member and by spaced confronting first and second belt means trained over the convex support member, a first pair of spaced pulleys positioned at opposite ends of the convex support member for supporting the first belt means over the first convex support, one of the first pair of pulleys located at the entrance to the conveyor path and the other being located at the beginning of the intermediate section of the conveyor path, a second pair of spaced pulleys one of which is located at the entrance to the conveyor path and the other being located at the terminal end of the intermediate section of the conveyor path, said second pair of spaced pulleys for supporting the second belt means through the entrance and intermediate sections of the conveyor, said exit section being defined by second convex support member and by spaced confronting third and fourth belt means trained over the second convex support member, third and fourth pulley members located on opposite sides of the conveying path at the exit point from the conveyor, each of said third and fourth belt means being trained over the second convex support member in confronting relation to each other to define the exit section of the conveyor path, the third belt means being supported by the other of said second pair of pulleys and by the third pulley member, and the fourth belt member being supported by the other of said first set of pulley members and by the fourth pulley member, the second belt member and said fourth belt member being in confronting relationships over a portion of their path to define the intermediate section of the conveyor, and means for driving the confronting portions of said belt members in the same direction for conveying cartons, said second belt means and third belt means each comprising a pair of spaced belt members for engaging the lower carton surface, said first belt means and said fourth belt means each comprising a single belt member for engaging the upper carton surface said first belt member lying between the spaced second belt members through the entrance section, and the fourth belt members through the intermediate and exit sections of the conveyor, the first and second belt means being spaced from each other at the entrance to the conveyor, and pressure feed means including a pair of arms pivotally connected to the machine frame, a wheel fitted to each arm for engagement with the underside of cartons arriving at the entrance section of the conveyor, and means for pressing each wheel into engagement with said cartons so that the top side of each carton positively engages the first belt means as the leading underside edge of each carton engages the second belt means.

2. A conveyor as defined in claim 1 in which each of said convex support members comprises a support plate having a surface contour defining a quadrant of a circle.

3. A conveyor as defined in claim 2 in which each support plate consists of a low-friction material.

4. A conveyor as defined in claim 3 in which the low-friction material is ultra-high molecular weight polyethylene.

5. A conveyor as defined in claim 1 in which the conveying path is "S"-shaped.

6. An elevator conveyor for conveying cartons having substantially flat upper and lower surfaces spaced substantially parallel to each other from one elevation to another comprising a machine frame having a conveyor path therethrough extending from one elevation to another, said conveyor path including:
   (a) an entrance section having a curved path through which articles are moved from a generally horizontal to a generally vertical orientation;
   (b) an intermediate section through which articles are moved generally vertically, and,
   (c) an exit section having a curved path through which articles are moved from generally vertical to horizontal orientation, said entrance section being defined by first convex support member and by spaced confronting first and second belt means trained over the convex support member, a first pair of spaced pulleys positioned at opposite ends of the convex support member for supporting the first belt means over the first convex support, one of the first pair of pulleys located at the entrance to the conveyor path and the other being located at the beginning of the intermediate section of the conveyor path, a second pair of spaced pulleys one of which is located adjacent the entrance to the conveyor path and the other being located at the terminal end of the intermediate section of the conveyor path, said second pair of spaced pulleys for supporting the second belt means from adjacent the entrance section to the end of the intermediate section of the conveyor, said exit section being defined by second convex support member and by spaced confronting third and fourth belt means trained over the second convex support member, third and fourth pulley members located on opposite sides of the conveying path at the exit point from the conveyor, each of said third and fourth belt means being trained over the second convex support member in confronting relation to each other to define the exit section of the conveyor path, the third belt means being supported by the other of said second pair of pulleys and by the third pulley member, and the fourth belt member being supported by the other of said first set of pulley members and by the fourth pulley member, the second belt member and said fourth belt member being in confronting relationships over a portion of their path to define the intermediate section of the conveyor, and means for driving the confronting portions of said belt members in the same direction for conveying cartons, said second belt means and third belt means each comprising a pair of spaced belt members for engaging the lower carton surface, said first belt means and said fourth belt means each comprising a single belt member for engaging the upper carton surface said first belt member lying between the spaced second belt members through the entrance section, and the fourth belt members through the intermediate and exit sections of the conveyor, the first and second belt means being spaced from each other at the entrance to the conveyor, and pressure feed means including a pair of arms pivotally connected to the machine frame, a pair of pulleys with one being fitted to each arm, the belt members of the second belt means being trained over the pulleys for engagement with arriving cartons, said second belt means being trained under additional pulley means which is located horizontally between and vertically below the pressure feed pulleys and said one of the second pair of spaced pulleys which is located adjacent the path entrance, and means for pressing each pressure feed pulley and belt into engagement with said cartons so that the top side of each carton positively engages the first belt means as the leading under side edge of each carton engages the second belt means.

7. A conveyor as defined in claim 1 or 6 in which each of said belts has a circular cross-section.

* * * * *